(12) United States Patent
Ciarlo

(10) Patent No.: US 7,104,514 B2
(45) Date of Patent: Sep. 12, 2006

(54) POST PROTECTOR

(76) Inventor: Jeff Ciarlo, 350 Hubbard La., Crete, IL (US) 60417

(*) Notice: Subject to any disclaimer, the term of this patent is extended or adjusted under 35 U.S.C. 154(b) by 0 days.

(21) Appl. No.: 10/693,716

(22) Filed: Oct. 27, 2003

(65) Prior Publication Data

US 2005/0087664 A1   Apr. 28, 2005

(51) Int. Cl.
*A47B 95/00* (2006.01)
*A47B 57/04* (2006.01)
*E04H 12/28* (2006.01)

(52) U.S. Cl. .................. 248/345.1; 52/244; 211/191

(58) Field of Classification Search ............. 248/129, 248/121, 519, 345.1, 579, 645; 52/170, 244, 52/287.1, 288.1, 736.4; 211/191, 183; 256/1, 256/12.5, 19
See application file for complete search history.

(56) References Cited

U.S. PATENT DOCUMENTS

| | | | |
|---|---|---|---|
| 3,245,181 A | 4/1966 | Stephenson | |
| 4,088,229 A | 5/1978 | Jacoby | |
| 4,113,110 A | 9/1978 | Mittag | |
| 5,369,925 A | 12/1994 | Vargo | |
| 5,568,909 A | 10/1996 | Timko | |
| 5,622,356 A | 4/1997 | Duggan | |
| 6,298,537 B1 | 10/2001 | Dion | |
| 2003/0217526 A1* | 11/2003 | Larson | 52/736.4 |
| 2005/0087664 A1* | 4/2005 | Ciarlo | 248/345.1 |

* cited by examiner

*Primary Examiner*—Amy J. Sterling
*Assistant Examiner*—Tan Le
(74) *Attorney, Agent, or Firm*—Gregory B. Beggs

(57) ABSTRACT

A barrier for protecting a post, or similar vertical column secured to the floor. The barrier being formed to provide an interior enclosure and to be spaced away from the post when positioned around the post. The barrier having structure entirely interior thereto for securing the barrier to the floor and a prow-like front portion connected to side portions extending rearwardly of the surrounded post for front-to-back support strength and lateral deflective flexibility to absorb impact directed against the prow-like front of the barrier.

3 Claims, 2 Drawing Sheets

POST PROTECTOR

BACKGROUND OF THE INVENTION

There appears to be a need to provide an industrial post protector that will protect posts, such as those which are common in a storage warehouse, from damage by industrial material handling reach or pallet stacking trucks. This is a particular problem in regard to those trucks having reach support prongs or tines extending forwardly from the truck to prevent the truck from tipping when loaded. Also, when these types of trucks are used in storage or similar facilities, particularly in narrow aisle or other cramped space situations, the reach supports of the material handling trucks frequently strike the posts of storage racks at floor level as the reach prongs, of the trucks, are manipulated in and about the posts of the racks, by the truck.

Also, existing post protectors are typically secured by flanges fastened to the floor exterior to a post protector. This exposes the flanges, and the fasteners thereof, to truck wheels and reach prongs which, in turn, tends to cause damage to wheels and reach prongs of material handling trucks.

Numerous attempts have been made in the past to provide structures for protecting posts from being damaged by material handling equipment moved in and around a post at floor level. Most attempts at post protection provide some singular limited sort of protection for a post and require that the structure be attached to, or become part of, the post. As part of the post, any damage to the post protector results in damage to the post as well. Further, none of the prior attempts appear to provide adequate post protection while providing protection for the material handling equipment from damage from exterior structures of such post protectors.

None of the prior art post protectors appear to provide significant multiple elements of protection for a post at floor level, as well as providing protection to material handling equipment from damage from the protector.

Further, some prior art post protectors merely provide a vertically elongated shield that will tend to absorb only nominal impact. More significant impact will cause the shield to give way, resulting in damage to the post. None of the prior art appears to provide a strong resiliently resistive post protective structure that would preclude more significant engagement impact from damaging a post.

SUMMARY OF THE INVENTION

In view of the above, it is an object, among others, of this invention to provide a barrier post protector that is constructed so as to provide greater horizontal protection from damage by material handling truck reach prongs.

Further, it is an object of this invention to provide a post protector having a barrier which is structured so as to be pointed in the frontal area exposed to material handling equipment to deflect impacting equipment and to provide a structure to resistively flex laterally outwardly away from the post and the direction of a frontal impact force applied to the barrier, to absorb such impact and protect the post from the more significant impacts.

It is a further object of this invention to provide a barrier post protector which is structured so as to be entirely separate, and spaced from, the post to be protected so that potential damaging impact will be flexibly absorbed by the post protector and precluded from causing damage to the post.

Also, it is an object of this invention to provide a post protector which is structured so as to be secured to the floor around the post by securing structure which is entirely within the confines of the barrier, of the protector, precluding contact of the securing structure with the wheels or reach prongs of material handling trucks to protect these wheels and prongs from damage from the post protector structure.

Other advantages and novel aspects of the invention will become apparent upon the following detailed description, in conjunction with the accompanying drawings wherein.

Figure 1:
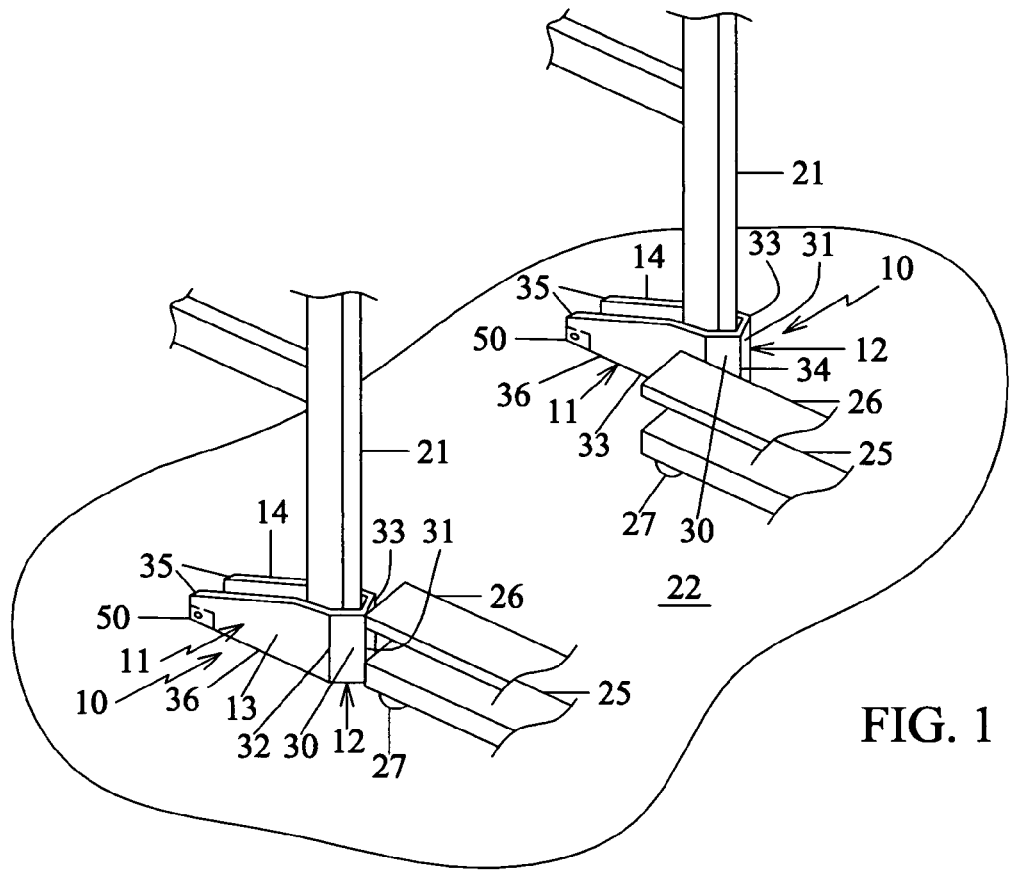
FIG. 1 is a perspective view of the post protector of this invention, showing post protector applied around posts of material stacking storage unit and showing partial reach and lift prongs of a material handling truck in an example engagement with the post protector, to the exclusion of the post.

The post protector of this invention is generally noted by the numeral 10 and includes barrier 11 with prow-like portion 12, side portions 13 and 14, and securing structures 15 and 16.

Barrier 11 (FIGS. 1–5) is preferably made of flexibly resistant metal or plastic and is designed to provide an interior space 20 (FIGS. 2 and 4) and to be positioned, around a post 21 to be protected, with side portions 13 and 14, and prow-like portion 12, spaced 20 away from post 21. Post 21 is secured to floor 22 by fastener anchors 23 (FIGS. 2 and 5) through flange 24 and into floor 22. It should be noted that barrier 11 of post protector 10 is structured so as to have prow portion 12 and side portions 13 and 14 spaced away 20 from post 21 when placed around post 21. This will tend to preclude barrier 11 of post protector 10 from engaging post 21 as the barrier is deformed by impact from reach or lift prongs 25 or 26 (FIGS. 1, 4 and 5). Reach prongs 25 are typically provided with support wheels 27 (FIGS. 1 and 5) which normally tend to move adjacent posts 21.

Additionally, protector prow 12 has two prow plane panel sides 30 and 31 respectively converging forwardly from vertical oblique dihedral bends 32 and 33 of barrier sides 13 and 14 to a vertical vertex angle prow point 34 of prow sides 30 and 31. Barrier sides 13 and 14 extend significantly rearwardly past post 21 to respective rear portions 35 with barrier bottom 36 on floor 22 to provide horizontal support and respective lateral horizontal resistive flexibility of sides 13 and 14 along with adjacent prow planes panels 30 and 31 (FIGS. 4 and 5).

Barrier 11 is secured to floor 22 around, and spaced away from post 21, by front and rear structures 15 and 16. Front structure 15 is a web connecting the front bottom portions 36 of prow plane panels 30 and 31 adjacent the base of vertical vertex 34 of prow 12. Web 15 has an aperture to accommodate anchor 42 to floor 22.

Figure 2:
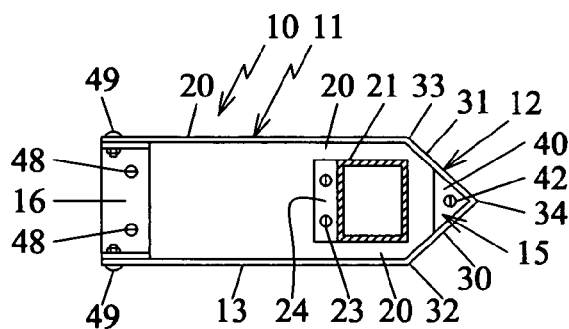
FIG. 2 is a top plan view of the post protector, of this invention, as applied around a post secured to the floor.
Figure 3:
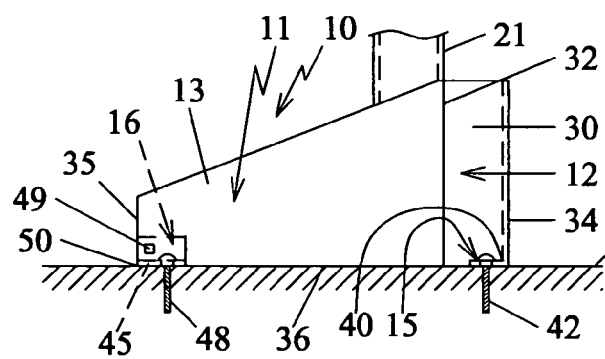
FIG. 3 is a side elevation view of the post protector, of this invention, as applied to a post secured to the floor.
Figure 4:
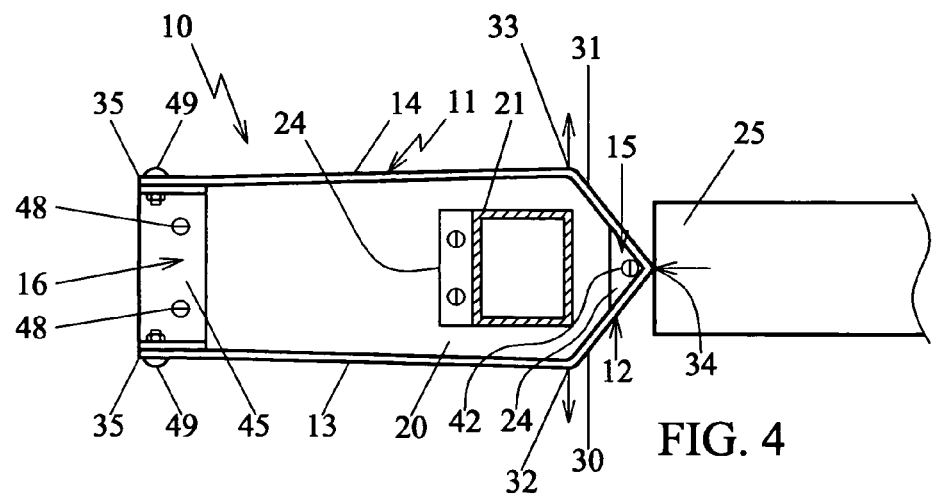
FIG. 4 is a top plan view of the post protector, of this invention, showing energy absorbing resistive deflection of the protector, away from the post, when the protector is struck by elements of a material handling truck.
Figure 5:
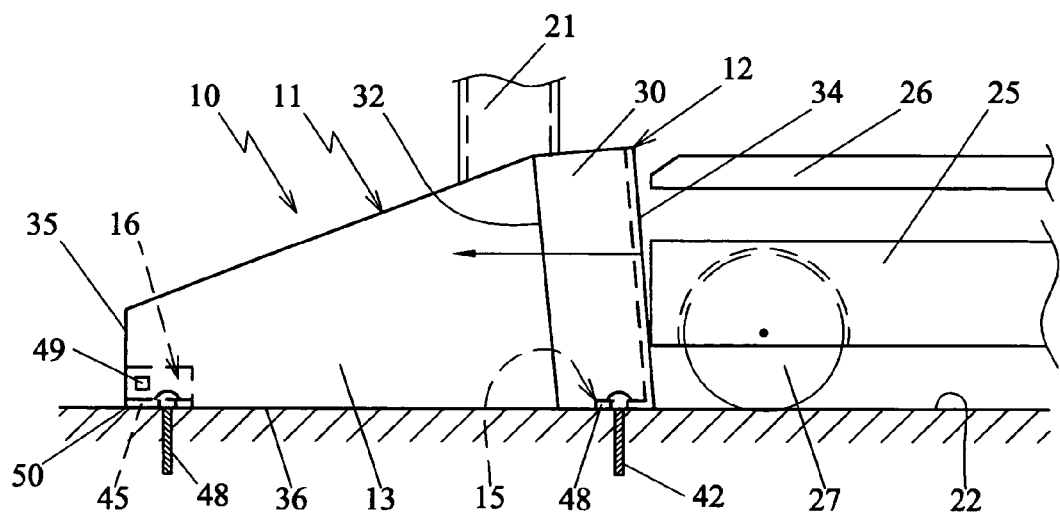
FIG. 5 is a side elevation view of the post protector, of this invention, showing energy absorbing resistive outward deflection of the protector, away from the post, when the protector is struck by elements of a material handling truck.

Rear web structure 16 has a central horizontal portion 45 with two vertical portions 46 (FIGS. 2, 3 and 4). Central portion 45 has apertures to accommodate anchors 48 to floor 22. Vertical portions 46 of rear structure 16 have respective apertures to accommodate anchor bolts 49 such as a smooth headed carriage bolt 49 seated in respective sides 13 and 14. Rear securing structure 16 thereby secures to the rear of protector 10 to floor 22 to prevent barrier bottom 36 from moving relative to post 21 and yet allow the upper portion of barrier 11 to resistively deflect (FIGS. 4 and 5) when barrier 11 is struck by a prong 25 or 26.

It should be noted (FIGS. 2–5) that securing carriage bolts 49 are positioned through vertical portions 45 of rear anchor structure 16 and are located far to rear portion 35, in barrier sides 13 and 14 of barrier 11, as is reasonably structurally appropriate. Anchors 48 are through central portion 45 of rear securing structure 16 forward of anchor bolts 49.

When barrier 11 is struck (FIGS. 4 and 5) by such as reach prongs 25, there is a counterclockwise upward force component tending to pull front anchor 42 rearwardly. Also, when barrier 11 is similarly struck there is an upwardly and rearwardly force against rear securing structure 16 causing it to be urged counterclockwise at the bottom rear at 50 (FIG. 5). Anchors 48, being farther forward than bolts 49, will have a moment arm resistance to the counterclockwise movement of securing structure 16.

In operation, the post protector 10, of this invention, was specifically developed to protect a post, such as post 21 (FIGS. 1–5) which is typically secured to a floor 22 by anchors 42 through a flange 24 (FIGS. 2, 4 and 5). Barrier 11 of protector 10, by virtue of its unique shape, is positioned around, and away from, post 21 (FIGS. 1, 2, 3 and 4) with a prow portion 12 facing forwardly to be exposed to the possible impact from support and lift prongs 25 and 26 of a material handling truck.

In the event of an impact from either a support or lift prong 25 or 26 (FIGS. 1, 4 and 5), the prong will tend to be either deflected by prow 12 to one side or the other of post 21 (FIG. 1) or will, in the alternative, tend to deflect prow 12 rearwardly and/or somewhat sideways into space 20, formed by barrier 11, between post 21 and prow 12.

It should be noted that when prow 12 is struck or deflected (FIGS. 4 and 5) by impact from such as prongs 25 or 26, the bottom 36 of barrier 11 will be retained from movement on floor 22 by front and rear anchors 28 in floor 22 (FIG. 5). The resistive flexibility of barrier 11, combined with the vertical oblique dihedrals 32, and vertical vertex angle point 34 of prow 12, provide a unique structure which allows the upper portions of barrier 11 to resistively and flexibly deform without contact damage to post 21.

In particular, if protector 10 is struck by material handling equipment, prow 12 will be moved rearwardly toward post 21 (FIGS. 1, 2, 4 and 5) into space 20, forcing upper portion of prow panel sides 13 and 14 angularly outwardly at vertical oblique dihedrals 32 (FIG. 4) forcing barrier sides 13 and 14 outwardly away from post 21. Thus, prong 25 or 26 impact against prow 12 will be resistively deflected inwardly by upper portion of prow 12 and outwardly by upper portion of sides 13 and 14 in space 20, protecting post 21.

Further, in operation, the post protector of this invention virtually eliminates the possibility of damage to truck equipment such as reach prongs 25, reach prong wheels 27, or lift prongs 26 inasmuch as barrier 11 provides for all securing structures to be internal in space 20 beyond contact with such material handling truck equipment.

It is to be understood that the invention is not to be limited to the specific constructions and arrangements shown and described, as it will be understood to those skilled in the art that minor changes can be made without departing from the principles of the invention.

What is claimed is:

1. A post having a base portion secured to a support surface and a protector for said base portion comprising, in combination: a barrier positioned horizontally around and spaced away from all sides of the post providing a space between said barrier and the post to protect the base portion of said post from being struck by a moving object adjacent the support surface; said barrier defining an interior enclosure enclosing the post and providing complete spacing of said barrier away from the post; said barrier also having front and rear portions, said rear portion containing a support portion extending horizontally rearwardly beyond the post and a securing member inside the barrier securing said barrier to the support surface rearwardly of the post; and said barrier also having resistively flexible oblique vertical bends between said front portion and said rear support portion whereby when said barrier is deflected rearwardly said rear support portion will resiliently deflect outwardly away from the post against the retention reaction of said securing member.

2. The combination defined in claim 1 in which a central beam is positioned totally within said rearwardly extending barrier portion and adjacent the most rearward portions thereof and is secured thereto, said central beam also being secured to the support surface forwardly of said most rearward portions of said rearwardly extended barrier portion and providing a resistive force when said barrier front portion is deflected rearwardly, whereby when said barrier is deflected rearwardly said rear support portion will resiliently deflect outwardly away from the post.

3. The combination of a post, a support surface for the post, and a post protector for protecting a base portion of the post standing on the support surface comprising:

a front member of the protector and a rear member of the protector having segments integrally connected to each other defining an interior enclosure to extend upwardly from the support surface to enclose the base portion of the post and provide complete spacing of the protector away from all sides of the post, the front member including at least one support surface engagement portion extending intermediate the front portion segments and the post engaging the support surface between the front portion segments and the post, and flexible bending elements in the front portion segments moveable away from the post when a portion of the front member is deflected toward the post, and the rear member having a support surface engagement portion engaging the support surface on the side of the post opposite from the support surface engagement portion of the front member.

* * * * *